Dec. 10, 1929.                S. SIDELLA                1,739,331
                          SNOW REMOVING MACHINE
                      Filed Dec. 27, 1927        4 Sheets-Sheet 1
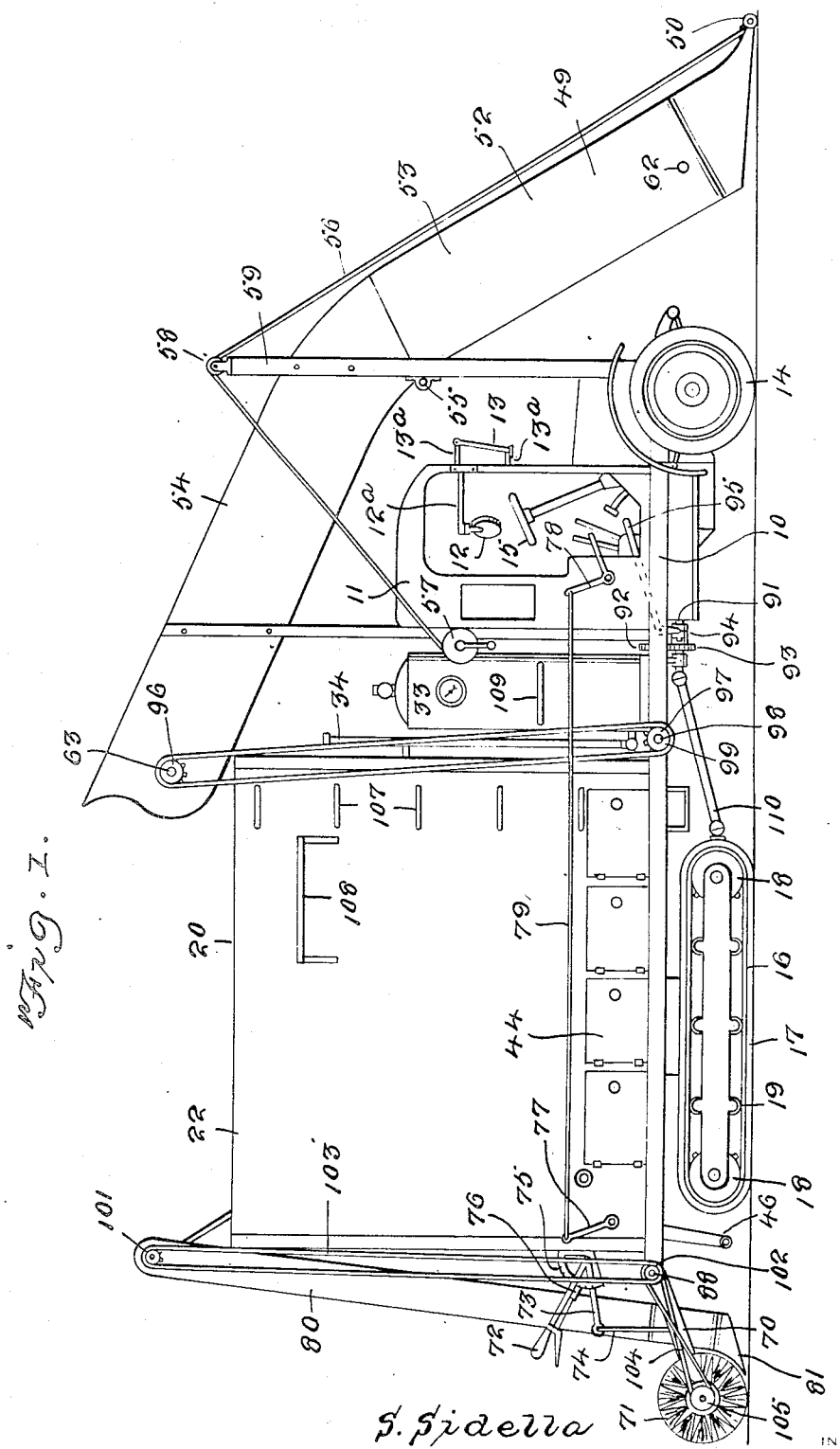

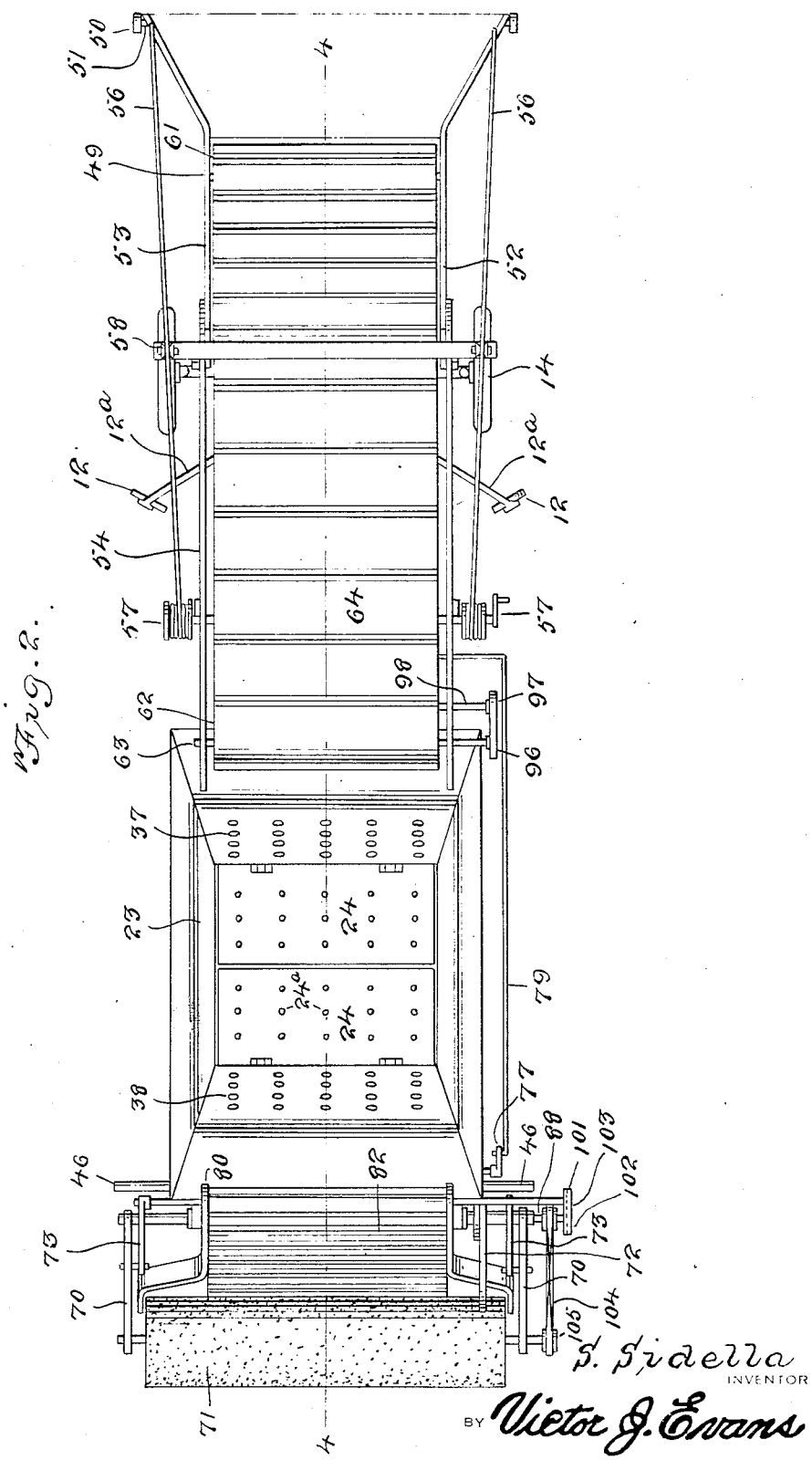

Dec. 10, 1929.                S. SIDELLA                1,739,331
                          SNOW REMOVING MACHINE
                          Filed Dec. 27, 1927         4 Sheets-Sheet 3

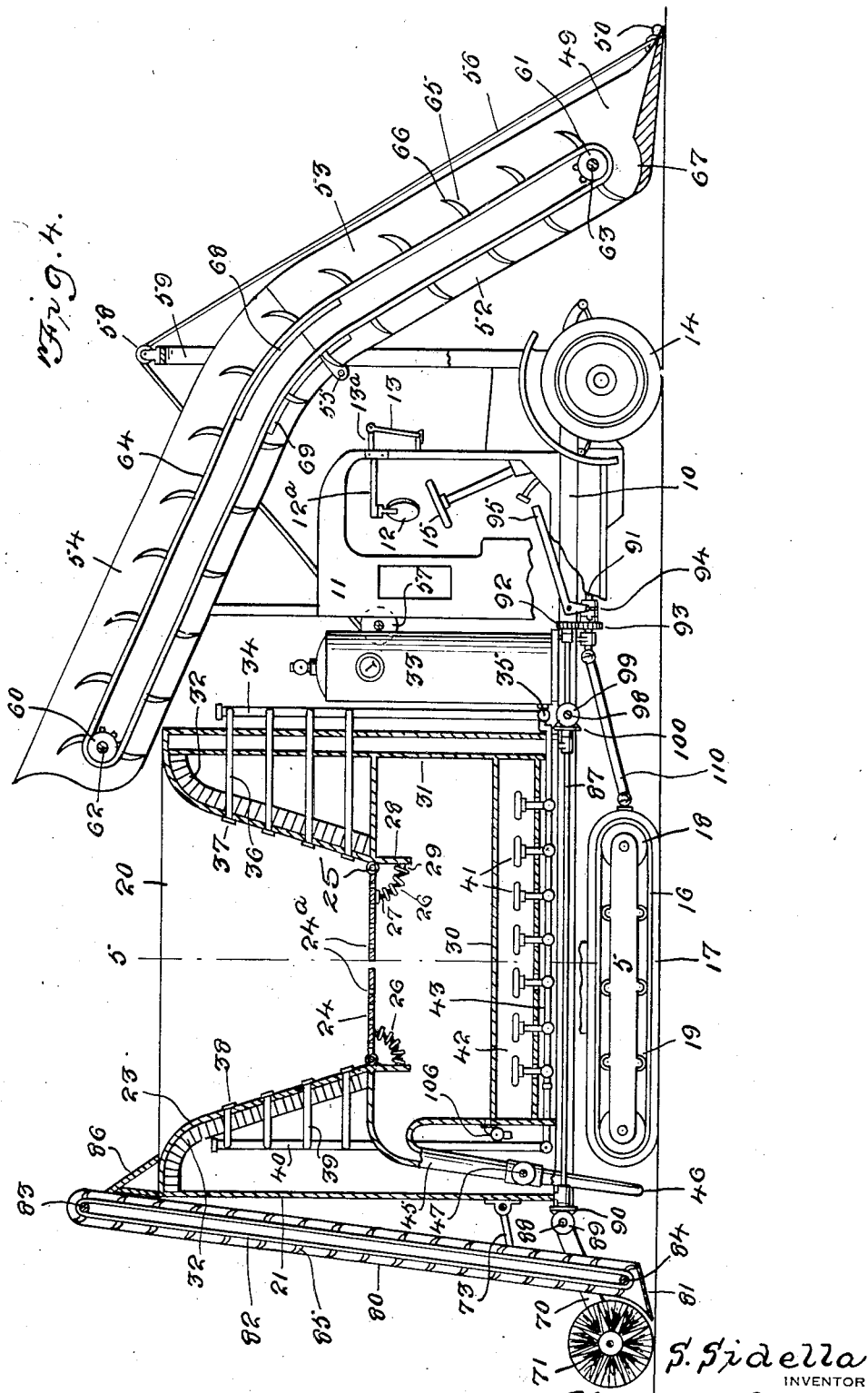

Patented Dec. 10, 1929

1,739,331

UNITED STATES PATENT OFFICE

STEPHEN SIDELLA, OF PORT CARBON, PENNSYLVANIA

SNOW-REMOVING MACHINE

Application filed December 27, 1927. Serial No. 242,668.

The present invention relates to street cleaning machines and particularly to machines for freeing the street of snow accumulation.

Objects of the invention are to improve machines of this character and to provide novel and effective mechanism for thoroughly cleaning snow and ice from the streets.

A further object is to provide in a machine of the above character an organization of parts so that the snow cleaned from the streets will be melted and the water therefrom heated for use in completing the cleansing of the street or roadway.

A further object is to provide a machine in which the cleaning mechanism may be lifted from the ground when not in use.

Further objects and advantages will appear from the following specification and will be set forth in the appended claims.

In the drawings:—

Figure 1 is a side elevation of a machine constructed in accordance with my invention.

Figure 2 is a plan view thereof.

Figure 3 is a rear elevation.

Figure 4 is a section on line 4—4 of Figure 2 through the longitudinal center of the machine.

Figure 5 is a section on line 5—5 of Figure 4 parts of the tractor of the machine being omitted.

Referring to the drawings in detail, 10 designates the frame of a vehicle as an automobile truck which is provided with a cabin 11 in which is located the driver's seat and the operating mechanism for the automotive vehicle. Due to the peculiarities of the machine as will hereinafter appear, the cabin is provided with a plurality of mirrors 12 and 13, the mirrors 12 being supported laterally of the cabin by means of brackets 12ª and the mirror 13 in front of the driver by means of brackets 13ª. The side mirrors 12 are adjustable and preferably arranged at angles such that objects reflected therein will be reflected upon the mirror 13 in front of the driver's seat.

The forward portion of the truck is provided with dirigible wheels 14 which are directed in their path by means of the steering wheel 15, the usual brakes and clutches of a vehicle of this character being used in the control of the truck. The rear portion of the truck, however, is supported on the shown traction means 16 of the usual construction having an endless belt 17 trained about rollers 18 and provided with anti-friction rollers 19 lying between the rollers 18. Mounted upon the truck is a body 20 having vertical end and side walls 21 and 22 and provided in its upper portion with a hopper 23 having downwardly sloping walls and provided at the bottom with trap doors 24 hinged to the front and rear walls of the hoppers as shown at 25, said trap doors having perforations therein to provide for drainage of liquid from the snow, the perforations being indicated at 24ª and the doors being held normally in closed position by springs 26 secured to the doors by lugs 27 and to abutments 28 by lugs 29, the said springs being adjusted to bear a predetermined weight of snow upon the trap doors. When the weight of snow exceeds the predetermined amount, it will appear that the trap doors will open allowing the snow to be precipitated therethrough upon the bottom 30 of the tank 31, said tank containing hot and preferably boiling water as will later appear.

The sides of the hopper 23 are preferably lined with fire brick 32 in order that the heat within the hopper may be in a measure confined thereto.

Mounted upon the truck is a gas tank 33 capable of storing an adaquate quantity of gas under pressure, said gas to be utilized both in the propulsion of the truck and for heating the hopper 23 and the tank 31 thereneath. For this purpose I provide pipes 34 and 35 leading from the tank at a point adjacent the bottom thereof. The pipe 34 is provided with a plurality of branches 36 extending laterally therefrom through the walls of the body 20 and through the fire brick 32 and the walls of the hopper 23, said branches having nozzles 37 thereon through which the gas is projected horizontally into the hopper. A similar series of nozzles 38 project through the rear wall of the hopper and are connected with branches 39 leading from a pipe 40 connected with the pipe 35 whereby gas is fed to the hopper both from the front and rear sides thereof. A plurality of ring burners 41 are provided beneath the bottom 30 of the tank 31 and are located in a compartment 42. The burners are connected through pipes 43 with the pipe 35. The compartment 42 is provided with a plurality of doors 44 at one side of the machine through which access to the compartment may be had for cleaning the same and for lighting the burners 41. Extending through the tank 31 and from a point adjacent the upper portion thereof and at the rear side is a conduit 45 having a nozzle 46 at the end thereof and a controlling valve 47 for regulating the flow of fluid through said conduit.

The nozzle is provided with branches 48 which may have a plurality of apertures therein for distributing the fluid from the tank 31 transversely of the street or roadway.

Forwardly of the machine, I provide a scoop 49, the forward end of which is adapted to rest in close proximity to the ground but is supported in spaced relation therefrom by rollers 50 rotatably secured thereto by means of stub shafts 51. A chute 52 extends rearwardly upward from the scoop and is made of two sections 53 and 54 hinged together at 55, the front section 53 of the chute being arranged when in operative position at an angle to the upper section 54 and at an angle to the ground of substantially 45 degrees, the upper section lying at a flatter angle to the ground and being stationary relative to the truck, the lower section, however, being adapted to be lifted off the ground by the scoop when the machine is to be put out of operation for snow cleaning purposes, the forward section of the chute being adapted as set forth above to be lifted off the ground by means of cables 56 secured to the forward end thereof and connected with a windlass 57, the cables being trained over pulleys 58 rotatably mounted on the upper ends of uprights 59 secured to the forward end of the truck.

The chute 52, it will be noted, is located directly in front of the cabin and in consequence, the function of the mirrors 12 and 13 will be appreciated. In the chute, and transversely of the ends thereof are hinged rollers 60 and 61, said rollers being mounted on shafts 62 and 63 extending transversely of the chute and rotatable relative thereto. Trained about the rollers is an endless belt 64 having cleats 65 extending therefrom, said teeth being preferably curved forwardly as shown at 66. The end of the scoop 49 is provided with a curved depression 67, the curvature of which is concentric with the roller 61, the radius of said curvature being such as to snugly accommodate the cleats 65 as they pass around the roller 61 whereby the snow accumulated on the scoop 49 will be prevented from passing over the rear edge thereof and will be completely carried up from the elevating endless belt 65.

The chute 52 is provided adjacent the hinge 55 with guide-ways 68 and 69 in order to effect the movement of the belt around the angle formed between the upper and lower sections of the chute, the members 68 and 69 extending from the sides of the chute contacting with the edges of the belt at the sides of the cleats. The guide-ways 69 are recessed to accommodate the cleats 65 in passing.

At the rear of the truck is pivotally mounted a frame 70 on which is rotatably secured a cylindrical brush 71, said brush being designed for sweeping the snow clean and for also scrubbing the street with the water from the nozzle 46 described above or with the snow melted by steam ejected through said nozzle.

The brush 71 is adapted to be raised off the ground through the instrumentality of the hand lever 72 of well known construction having an arm 73 extending therefrom which arm is connected with the pivoted frame 70 through links 74, the lever 72 being arranged and held through various adjustments by means of the notch sector 75 and spring pressed tooth 76, the latter being slidably mounted on the lever 72 and being of well known construction.

The valve 47 described above and located in the conduit 45 for controlling the flow of fluid from the tank 31 to the nozzle 46 may be operated from the driver's seat through levers 77 and 78 pivotally mounted on the machine adjacent said valve and adjacent the driver's seat, the lever 78 being of the bell crank variety having one arm thereof connected with the lever 77 through a link 79 and the other arm free to be grasped by the operator for operating the same.

Adjacent the sweeper 71 is a chute 80 having a rearwardly and downwardly extending platform 81 secured thereto. Within the chute 80 is arranged an endless belt 82 trained about rollers 83 and 84 and having teeth 85 extending therefrom, said teeth being similar to the cleats 65 and having their outer ends curved so as to expand upwardly when moving upward about the rollers.

The upper end of the hopper 23 is provided with an inclined guide 86 extending from the chute downwardly towards the open upper end of the hopper for directing the material conveyed upwardly by the teeth 85 into the hopper. The sweeper 71 and the endless belt 82 are driven from the engine of the truck through a shaft 87, shaft 88 extending at right angles to shaft 87 and in driven connection therewith by means of miter gears 89 and 90 respectively on the transverse shaft 88 and on the longitudinal shaft 87, the shaft 87 being geared to the power shaft 91 and the engine by means of gears 92 and 93, the latter being loosely mounted on the shaft 91 and adapted to be thrown into driven connection therewith by means of the clutch 94 slidably mounted thereon and under the control of the driver of the truck through the lever 95 pivoted to the side of the cabin.

The endless belt 64 is driven through the pulleys 96 and 97, the former being secured to the shaft 62 and the latter to the shaft 98 transversely of the machine and having a miter gear 99 in driven connection with a miter gear 100 secured to the shaft 87, the endless belt 82 being in driven connection with the transverse shaft 88 through pulleys 101 and 102 respectively secured to the roller 83 and to the shaft 88 and a belt 103 trained about said rollers.

The sweeper 71 is driven through the cross belt 104 trained about a pulley on the shaft 88 and a pulley 105 secured to the sweeper. A drainage cock is provided at the bottom of the tank 31 to drain off liquid therefrom and ladder rounds 107 are provided on the side of the body 21 in order to enable an attendant to climb up to a platform 108 secured to the side of the body or to climb into the tank for adjusting parts thereof for cleaning the same.

A platform 109 is provided adjacent the tank 33 in order to enable an attendant to operate the windlass 57.

The operation of the device is as follows: Assuming that the machine is to be used to clean snow and ice off a roadway, the engine of the truck is started and when the same has been connected with the traction means through the shaft 91 and 110, the scoop 49 is lowered through the instrumentality of the windlass 57 and the clutch 94 is thrown into engagement with the gear 93 whereby the endless belts 64 and 82 and the sweeper 71 are set in motion. Snow and débris are conveyed by the endless belts into the hopper 23 and the snow is melted by flames shooting from the nozzles 37 and 38 which have been previously lighted, the residue of snow being deposited on the trap doors 34 and when a sufficient accumulation thereof has been deposited on the doors, the same will be opened against the force of the springs 26 allowing the accumulating snow to be deposited in the tank 31 where it will be melted by the hot water within said tank, the tank being heated through the instrumentality of the burners 41 located therebeneath.

Through the control 78, 79 and 77 the liquid or steam therefrom may be directed onto the surface of the ground through nozzle 46 whereby the remaining snow and ice adhering to the street or pavement will be melted or softened whereupon the sweeper 71 will act thereon sweeping the liquid to one side of the road and directing the softened snow or ice upon the platform 81 from which it is conveyed upward by the endless belt 82 and deposited in the hopper over the inclined guide 86.

When it is desired to throw the cleaning apparatus out of operation, the forward end may be raised through the cables 56 off the ground and the sweeper may be raised through lever 71. The machine may then be moved along the ground without cleaning effect thereupon.

Having described my invention what I claim is:—

1. In a device of the character described, a hopper, means to convey snow to said hopper, a tank beneath said hopper, said hopper and tank having an opening between the same, apertured trap doors controlling said opening and being adapted to be opened under a predetermined load thereupon, means for automatically returning said doors to their normal position, and outlet means for said tank.

2. A snow cleaning device comprising a motor operated tractor truck, a body thereon, means for directing snow into said body and operated from the motor of said truck, heating means for said snow, a tank in said body, means for heating said tank, a conduit leading from said tank, a nozzle in said conduit, a sweeper rearwardly of said nozzle, means for directing the flow of fluid from said conduit upon opposite sides of said truck, means for rotating said sweeper from the motor and a conveyor leading to said body from said sweeper and being operated by the motor.

3. A machine for cleaning snow from roadways and the like comprising a truck adapted to be moved along said roadway, a body on said truck, a hopper therein, a tank beneath said hopper, means for heating said hopper and for heating said tank, a wheeled scoop forwardly of said truck, a conveyor leading from said hopper to said scoop, a nozzle in connection with said tank, means for controlling the flow of fluid from said tank through said nozzle, and a sweeper rearwardly of said nozzle rotatably mounted on said truck, means for rotating said sweeper, and a conveyor leading from said sweeper to a point above said hopper.

In testimony whereof I affix my signature.

STEPHEN SIDELLA.